United States Patent [19]

Sauer et al.

[11] 4,446,515

[45] May 1, 1984

[54] PASSIVE BUS SYSTEM FOR DECENTRALLY ORGANIZED MULTI-COMPUTER SYSTEMS

[75] Inventors: Anton Sauer, Germering; Hans H. Witte, Munich, both of Fed. Rep. of Germany

[73] Assignee: Siemens Aktiengesellschaft, Berlin & Munich, Fed. Rep. of Germany

[21] Appl. No.: 221,770

[22] Filed: Dec. 31, 1980

[30] Foreign Application Priority Data

Jan. 17, 1980 [DE] Fed. Rep. of Germany ....... 3001638

[51] Int. Cl.³ .................... G06F 3/04; G06F 15/16; G02B 5/14
[52] U.S. Cl. ......................... 364/200; 350/96.16; 350/96.1
[58] Field of Search ... 364/200 MS File, 900 MS File; 350/96.1, 96.15, 96.16, 96.2

[56] References Cited

U.S. PATENT DOCUMENTS

| | | | |
|---|---|---|---|
| 3,874,780 | 4/1975 | Love | 350/96.16 |
| 3,883,217 | 5/1975 | Love et al. | 350/96.16 |
| 4,017,149 | 4/1977 | Kao | 350/96.16 |
| 4,027,153 | 5/1977 | Käch | 350/96.16 |
| 4,089,584 | 5/1978 | Polczynski | 350/96.15 |
| 4,161,650 | 6/1979 | Caouette et al. | 350/96.16 |
| 4,168,532 | 9/1979 | Dempsey et al. | 364/900 |
| 4,169,656 | 10/1979 | Hodge | 350/96.15 |
| 4,184,739 | 1/1980 | D'Auria et al. | 350/96.15 |
| 4,195,351 | 3/1980 | Barner et al. | 364/900 |
| 4,199,809 | 4/1980 | Pasahow et al. | 364/200 |
| 4,225,919 | 9/1980 | Kyu et al. | 364/200 |
| 4,232,385 | 11/1980 | Hara et al. | 350/96.15 |
| 4,249,266 | 2/1981 | Nakamori | 350/96.16 |
| 4,276,656 | 6/1981 | Petryk, Jr. | 350/96.16 |
| 4,289,373 | 9/1981 | Sugimoto et al. | 350/96.16 |
| 4,294,508 | 10/1981 | Husbands | 350/96.15 |
| 4,301,543 | 11/1981 | Palmer | 350/96.15 |

OTHER PUBLICATIONS

Erdel et al., "Glasfaser-Bussysteme zur Signaluebertragung in Bordnetzen", *Frequenz*, vol. 31, 1977, pp. 364–368.

Witte et al., "Planar Input-Output Couplers in Thick-Film Technology for Multimode Optical Fibers", *Siemens Forschungs und Entwicklungsberichte*, vol. 8, 1979, pp. 141–143.

Reichelt et al., "Improved Optical Tapping Elements for Graded-Index Optical Fibers", *Siemens Forschungs und Entwicklungsberichte*, vol. 8, 1979, pp. 130–135.

Witte, H., "Bus Systems with Optical Waveguides", *Siemens Forschungs und Entwicklungsberichte*, vol. 7, 1978, pp. 325–327.

Sauer, A., "Sequential System Structures", *Siemens Forschungs und Entwicklungsberichte*, vol. 7, 1978, pp. 319–321.

*Primary Examiner*—Charles E. Atkinson
*Assistant Examiner*—Gary V. Harkcom
*Attorney, Agent, or Firm*—Hill, Van Santen, Steadman & Simpson

[57] ABSTRACT

A passive bus system for decentrally structured multi-computer systems, particularly multi-microcomputer systems, allows execution of a bit-serial information exchange between the individual computers of the system achieving the bandwidth required for high transmission speeds with simple and reliable means, capable of decentralized monitoring and control. Exclusively optical transmission means is employed for all data exchange operations in a communications level shared by all of the function units of the multi-computer system, exclusively decentralized control devices are individually allocated to the function units for control of the bus system seizure.

23 Claims, 12 Drawing Figures

PASSIVE BUS SYSTEM FOR DECENTRALLY ORGANIZED MULTI-COMPUTER SYSTEMS

BACKGROUND OF THE INVENTION

1. Field of the Invention

The present invention relates to a passive bus system for decentrally organized multi-computer systems, particularly multi-systems incorporating plural microcomputers.

2. The Prior Art

Multi-computer systems which employ currently available microcomputers (for example, INTEL microcomputer Model 8086) require bus transmission speeds of at most 3 M bits per second. When the bits of data words are transmitted in parallel, the cost of system components such as transmitters, receivers, lines and equalizers, is n-times as high as the comparable system in which serial transmission is used, where n is the number of bits transferred simultaneously in parallel. On the other hand, with serial transmission, the bandwidth is increased by the factor n. The additional expense of increasing the bandwidth however, would have no effect on the cost of the system components. If additional technical devices were necessary for the increase in bandwidth, the system reliability would be decreased.

Because of constantly increasing demands which are made on multi-computer systems, which requires an increase in the processing speed of the overall system, a serial transmission mechanism is not realizable with conventional apparatus.

BRIEF SUMMARY OF THE PRESENT INVENTION

It is the principle object of the present invention to provide a multi-computer system in which serial transmission is employed for communication among the system components, without imposing a decrease in system operational speed. This object is achieved by the employment of optical components instead of electrical components in the bus system of a decentrally organized multi-computer system.

Recently, the essential components of an optical communication system such as transmitter-modulators, receivers and transmission media, have been improved to such a great degree with respect to quality and lifetime that optical information transmission represents a superior alternative to purely electrical communication systems. See Erdel and Strehl, "GlasfaserBussysteme zur Signalübertragung in Bordentzen" *Frequenz*, Volume 31 (1977) pages 364–368.

Optical systems are useful in message communication and data processing. The advantages of such systems are high transmission capacity, low weight and volume, and freedom from cross-talk. In addition, optical systems are not sensitive to interference from electric or magnetic fields. These characteristics have differing significance, depending on the particular system environment.

The properties of passive optical modules such as plugs, branchings, and mixers have been significantly improved, making it possible to provide an optical bus network for the communication between terminal devices, instead of using a point-to-point electrical connection. The construction and properties of the modules are referred to in Witte and Kulich, "Planar Input-Output Couplers in Thick-Film Technology for Multimode Optical Fibers", *Siemens Forschungs- und Entwicklungsberichte*, Volume 8, (1979) pages 141–143; and Reichelt et al., "Improved Optical Tapping Elements for Graded-Index Optical Fibers", *Siemens Forschungs- und Entwicklungsberichte*, Volume 8 (1979) pages 130–135; and Stockmann, "Planar Star Coupler for Multimode Fibers", (Manuscript submitted to OPT. Communications); and Witte, "Bus Systems with Optical Wave Guides", *Siemens Forschungs- und Entwicklungsberichte*, Volume 7 (1978), pages 325–327.

By use of the present invention, a passive bus system is created for decentrally organized multicomputer systems, particularly systems using plural microcomputers. The general outline of such a system is described by the inventor in "Sequential System Structures", *Siemens Forschungs- und Entwicklungsberichte*, Volume 7 (1978), pages 319–321. By use of the passive bus system, a bit-serial information exchange between individual computers of the system can be carried out, and the necessary bandwidth for transmission speeds is attainable with simple and reliable means. The passive bus system of the present invention has a decentralized monitoring and control, and exhibits low weight, small volume, and absolute freedom from cross-talk.

The passive bus system of the present invention employs exclusive optical transmission means for all data exchange operations in a communication level common to all of the functional units of the multi-computer system. The operation of the bus system is controlled exclusively by decentralized devices which are individually allocated to the various functional units of the system.

By use of the present invention, an economical, reliable, and decentrally organized multi-computer system can be realized in which a high transmission speed, low volume, low weight, and insensitivity to electrical and magnetic noise are realized. In addition, the control of the individual components of the data processing system is decentralized, controlled by means of the system components themselves, which yields a more reliable system than multi-computer systems incorporating known electrical bus arrangements.

A further advantage of the present invention is that such a system may be expanded as desired, because of the modularity of the organization, and the lack of any requirement for special non-modular components.

These and other objects and advantages of the present invention will become manifest by an inspection of the accompanying drawings and the following description.

DESCRIPTION OF THE DRAWINGS

Reference will now be made to the accompanying drawings in which.

DESCRIPTION OF THE PREFERRED EMBODIMENTS

Figure 1:
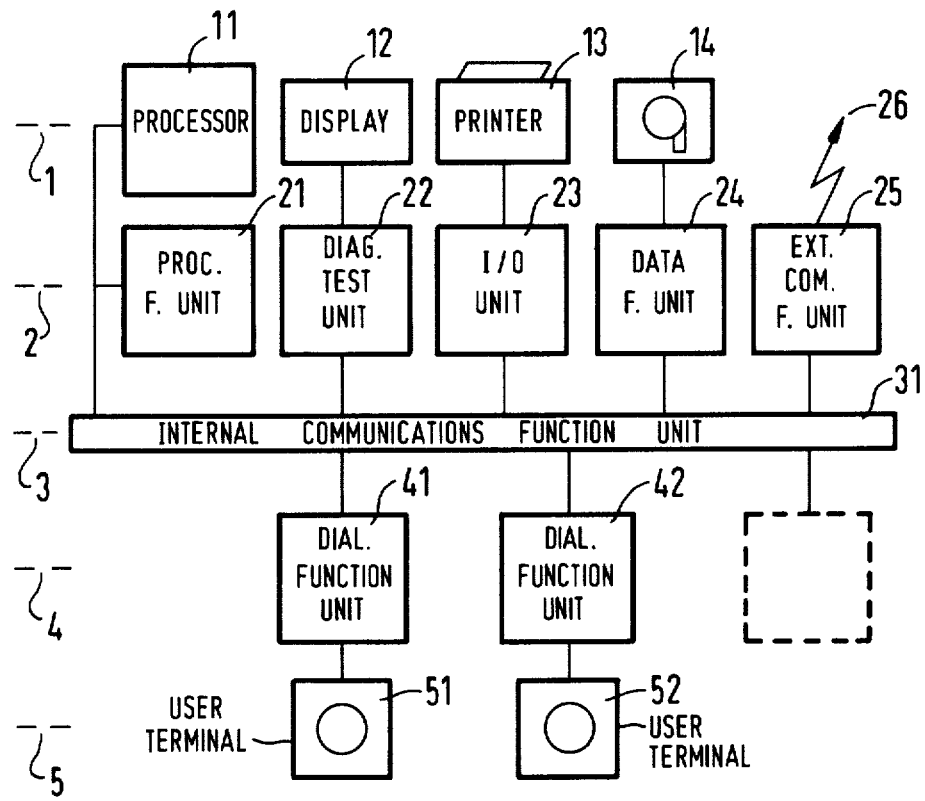
FIG. 1 is a functional block diagram of a multi-computer system incorporating a passive bus for internal communications, in accordance with an illustrative embodiment of the present invention.

Referring first to FIG. 1, a functional block diagram is illustrated of a multi-computer system organized in five levels. A peripheral level has a display device 12, a printer 13, and a data set 14. A function level 2, has a processing function unit 21, a diagnosis-test function unit 22, an input-output function unit 23, a data set function unit 24, and an external communication function unit 25. The units 12, 13 and 14 are connected to and cooperate directly with their respective units 22, 23 and 24, and the external communication unit 25 is connected to external communication devices symbolically represented at 26. The other units are directly connected to an internal communication function unit 31, which occupies the third level of the system organization. Level 4 is the dialog level, having a first dialog function unit 41 and a second dialog function unit 42. Level 5 is a user level, having first and second user terminals 51 and 52, respectively connected to the dialog function units 41 and 42. The dialog function units are connected directly to the internal communication function unit 31.

The internal communication function unit 30 is a passive system bus which is realized by means of optical apparatus as described in more detail hereinafter.

Figure 2:
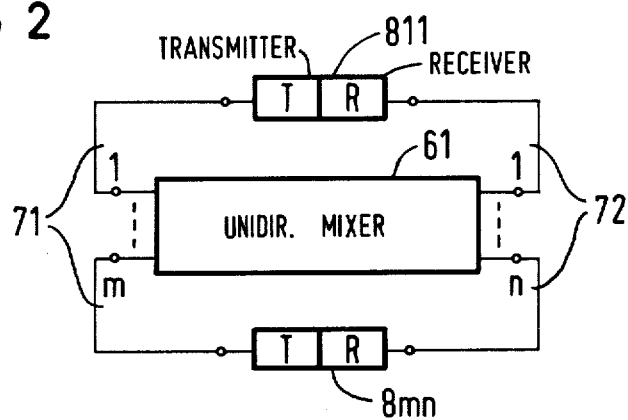
FIG. 2 is a generalized functional block diagram of a multi-computer system incorporating a passive bus using a star coupler.

FIG. 2 is a generalized functional block diagram of a multi-computer system incorporating a passive system bus having a star coupler 61. The star coupler is a unidirectional mixer, connected with a plurality of system components such as the transmitter-receivers 811, and 8mn. Each of the transmitter-receivers has a transmitter section T and a receiver section R. The transmitter sections are all connected to individual plural inputs of the mixer 61 over lines 71, and the mixer 61 functions to couple each of the input lines approximately equally to plural input lines 72, which are connected to the receiver sections of the transmitter-receiver units.

Figure 3:
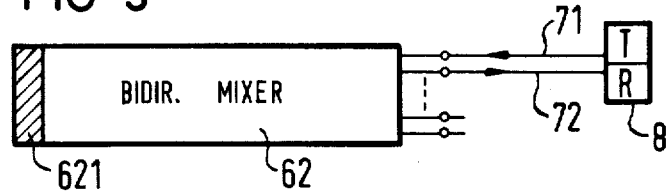
FIG. 3 is a generalized block diagram of a multi-computer system incorporating a passive bus using a bi-directional mixer.

FIG. 3 is similar to FIG. 2, except that a bidirectional mixer 62 is employed, whereby the transmission lines 71 and 72 are all connected to one side of the mixer 62. At the opposite end of the mixer 62, a mirror 621 is arranged, so that optical signals arriving over the input line 71 are reflected from the mirror and made available approximately equally to the output lines 72. One pair of input and output lines is shown connected to a functional unit 8, which is one functional component of the multi-computer system.

Figure 4:
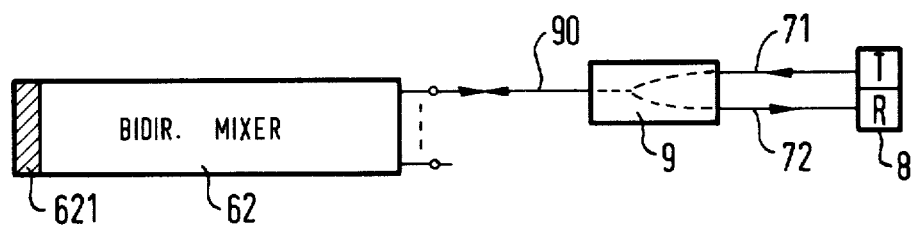
FIG. 4 is a generalized block diagram of a multi-computer system incorporating a passive bus using a bi-directional mixer and branching circuits between the mixer and the system functional components.

FIG. 4 is similar to FIG. 3, except that a branching unit 9 is employed for merging one pair of input and output lines 71 and 72 with a bidirectional communication line 90, which is connected to one input-output of the bidirectional mixer 62.

Figure 5:
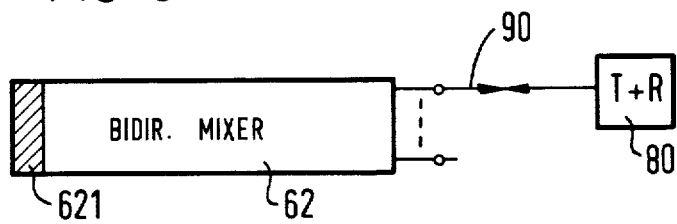
FIG. 5 is a generalized block diagram of a multi-computer system incorporating a bi-directional mixer, in which a single element is employed for the transmitter and receiver functions.

In FIG. 5, a bidirectional mixer 62 is employed, and the bidirectional input-output line 90 is connected directly to a single unit 80 which functions to perform both transmission and reception functions.

Any of the systems illustrated in FIGS. 2-5 may be employed as the internal communication function unit 31 in the apparatus of FIG. 1. Each of the function units represent micro-computers, and the employment of the optical mixers of FIGS. 2-5 produces a system in which communication is carried out exclusively with light, and not by conventional electrical signals. The communication is carried out by decentralized organization, and is controlled individually by each computer in the system. This organization makes it unnecessary to have a separate computer which is sometimes employed in electrical bus networks simply for controlling the operation of the communication apparatus.

The use of the apparatus illustrated in FIGS. 4 and 5, which allow all of the communication lines connected with the mixer 62 to function in a bidirectional fashion, allows a better use of the connection options with the terminals of the mixer 62.

Figure 6:
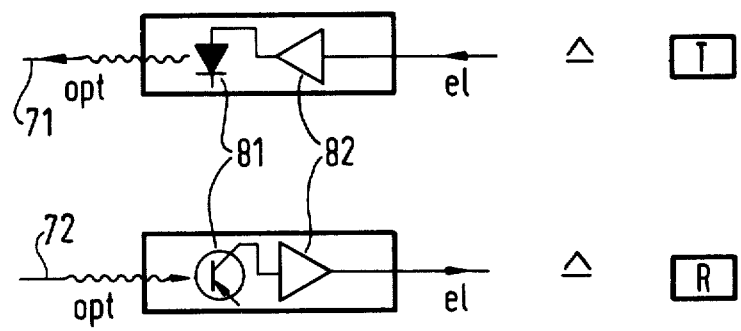
FIG. 6 is a schematic diagram of representative circuits which may be employed for the transmission and reception functions for communications with the passive bus.

FIG. 6 illustrates schematic diagrams of units which function as transmitters and receivers for connecting the micro-computers with the optical transmission lines. In the transmitter unit, current pulses corresponding to the message to be transmitted are supplied by a feed line el to an amplifier 82, the output of which is connected to a transducer 81 such as a light emitting diode. The light produced by such transducer is communicated through the optical transmission line 71. The receiver part R has a transducer 81 optically coupled to the optical transmission line 72. It is preferably a phototransistor, and its electrical output is amplified by an amplifier 82 and is presented to an output line in the form of electrical pulses corresponding to messages received over the line 72.

Figure 7:
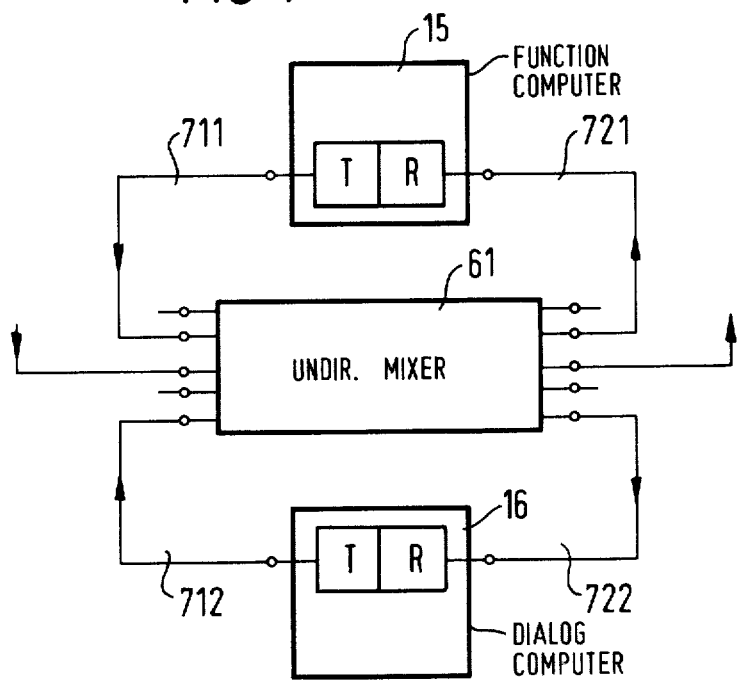
FIG. 7 is a functional block diagram of a multi-computer system incorporating a passive bus in which two of the components are a function, computer and a dialog computer.

FIG. 7 illustrates an embodiment of the present invention in which two functional units are a function computer 15 and a dialog computer 16. The transmitter units of the respective function computers are connected to input lines 711 and 712 of the unidirectional mixer 61, and output lines 721 and 722 are connected to their respective receivers.

Figure 8:
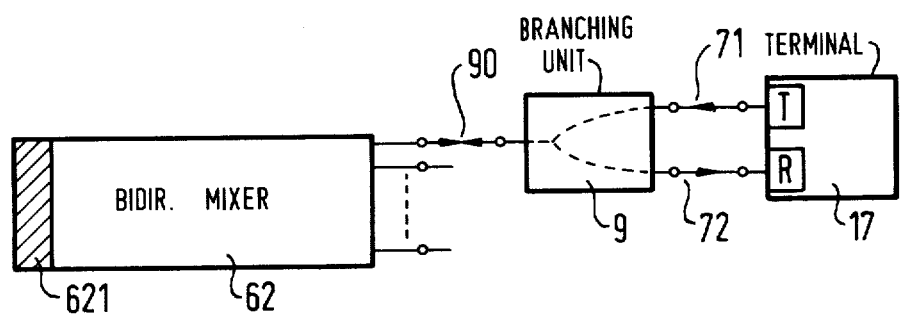
FIG. 8 is a functional block diagram of a multi-computer system incorporating a passive bus in which one of the functional units is a terminal.

FIG. 8 illustrates a terminal 17 connected with a bidirectional mixer 62, branching unit 9, and a bidirectional line 90 connected with the mixer 62. The terminal 17 has transmitter and receiver units within it which are connected to the branching unit 9 over lines 71 and 72. Although FIGS. 7 and 8 illustrate passive bus systems employing different kinds of mixers, either type may be employed in a system according to the present invention, or such a system may be made up of a combination of unidirectional and bidirectional mixers.

Figure 9:
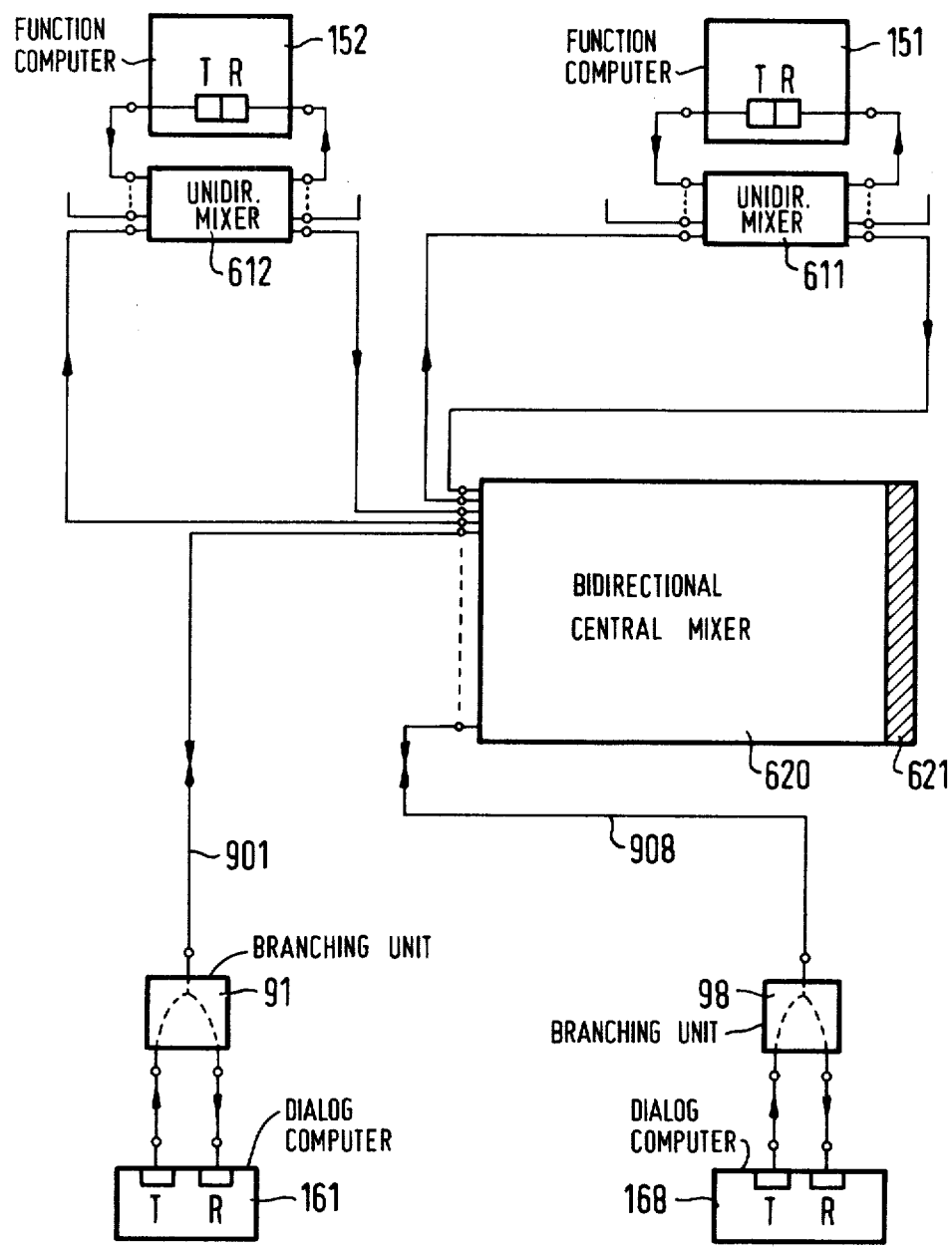
FIG. 9 is a functional block diagram of a multi-computer system incorporating a passive bus with a bi-directional central mixer and a plurality of unidirectional submixers.

FIG. 9 illustrates a multi-computer system which both unidirectional and bidirectional mixers. A bidirectional mixer 620 is employed as a central mixer, and a mirror 621 is located at one end of it. A first function computer 151 is connected with an input and an output of a unidirectional submixer 611, and another pair of input and output lines of this submixer are connected to two lines communicating with the bidirectional mixer 620. Two additional lines communicate with a second unidirectional submixer 612 associated with a second function computer 152. A plurality, for example 8, of additional lines communicating with the mixer 620 are connected through branching units to one of a plurality of dialog computers 161 . . . 168. Each has its own branching unit 91 . . . 98, which communicates with the mixer 620 over an optical transmission line 901 . . . 908.

The arrangement of FIG. 9 has a central level and a plurality of peripheral levels.

Figure 10:
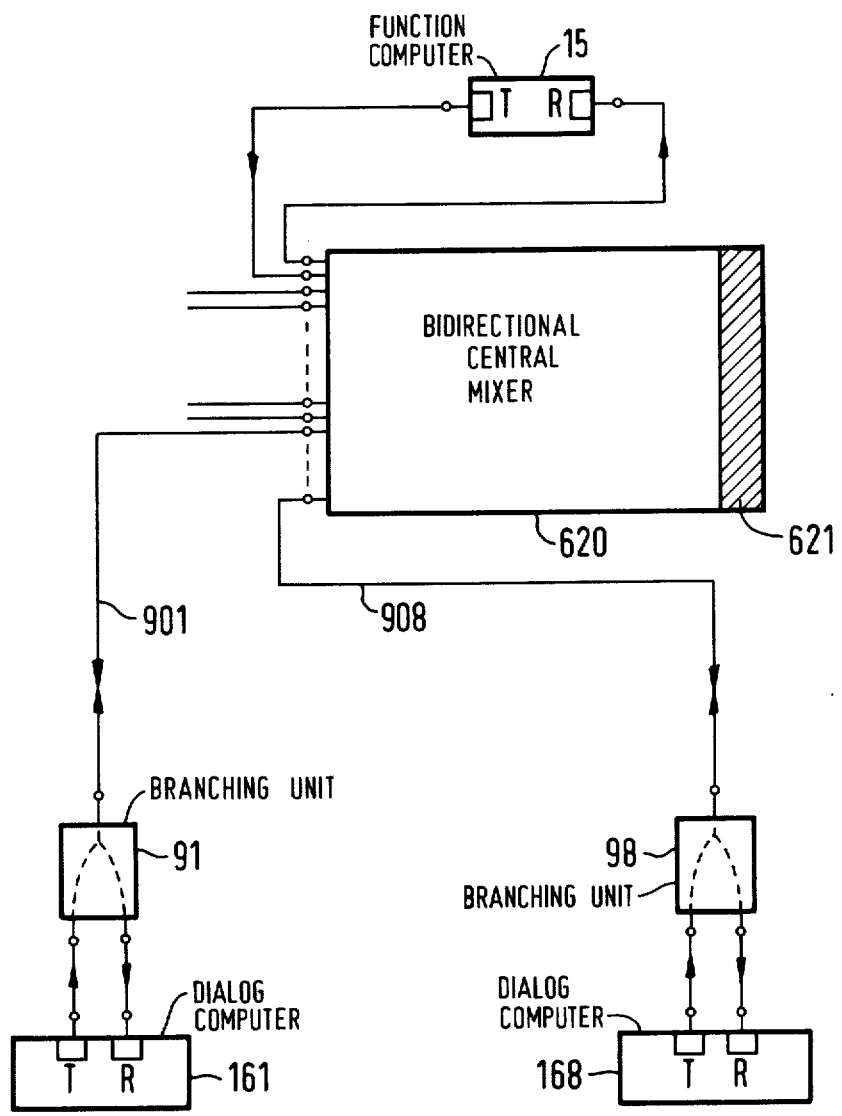
FIG. 10 is a functional block diagram of a system similar to FIG. 9, without the submixers.

FIG. 10 shows a similar arrangement, in which one function computer 15 is illustrated, and the submixer is omitted, with the input and output lines of the computer 15 being connected directly to the mixer 620.

The manner in which any particular bus system is organized depends on the respective problem definition for its multi-computer system. The present invention allows a flexibility of approach to system design, and makes available a plurality of different combinations of unidirectional mixers, bidirectional mixers, lines which may be operated unidirectionally or bidirectionally, branchings, discrete transmitters and receivers, and also single element transceivers.

Figure 11:
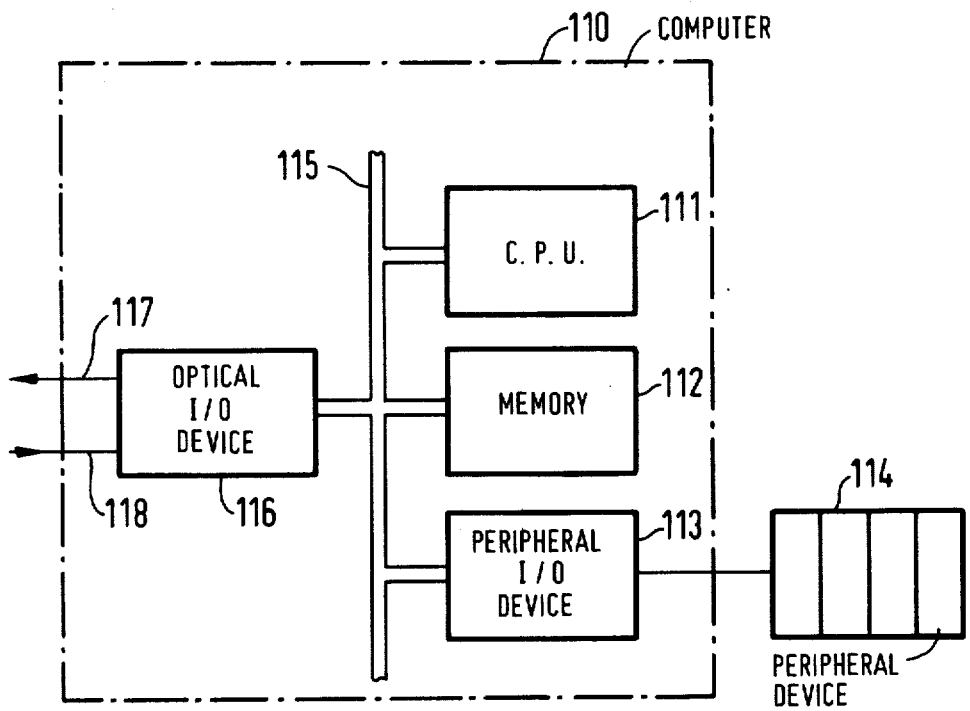
FIG. 11 is a functional block diagram of a computer which may be used as one of the functional units in the multi-computer system of the present invention.

FIG. 11 illustrates in functional block diagram form a computer 110 which may be incorporated into a system of the present invention as one of the computer units. The computer 110 incorporates an optical input-output device 116, which communicates with optical input and output transmission lines 117 and 118. At its other side, the device 116 is connected to the internal electrical computer bus 115, which communicates with a CPU 111, a memory unit 112, and a peripheral input-output device 113 which is in turn connected to a peripheral device 114.

Figure 12:
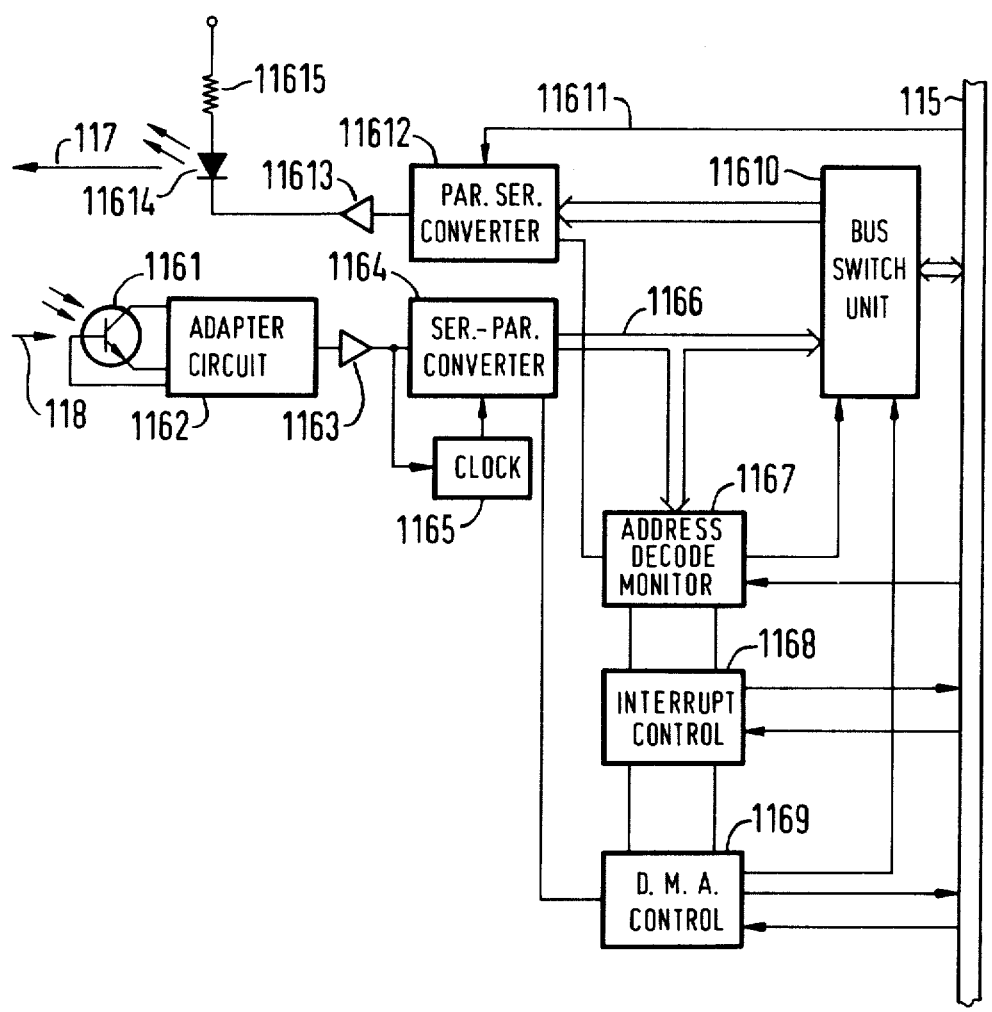
FIG. 12 is a functional block diagram of an input-output module used in the arrangement of FIG. 11.

FIG. 12 illustrates a functional block diagram of the optical input-output device 116 of FIG. 11. The input line 118 is optically coupled with a phototransistor 1161, which is connected to an adapter circuit 1162. Its output is connected through an amplifier 1163 to the input of a serial to parallel converter unit 1164. A clock unit 1165 is also connected to the output of the amplifer 1163. The clock signals are derived from the pulses at the output of the amplifier 1163, which correspond to the incoming optical information, namely the chronologically succeeding light pulses carried over the transmission line 118. By means of this control clock, the serial to parallel converter 1164 is operated to provide a parallel bit output on a bus 1166. The serial to parallel converter 1164 temporarily stores information bits until a complete word is assembled, which is made available to the bus 1166 in parallel form.

The bus 1166 is connected to an address decode-monitor logic unit 1167 which recognizes the address of the associated minicomputer 110. The unit 1167 is connected to an interrupt control unit 1168, which functions to produce signals communicating with the bus 115 required to interrupt ongoing activities of the computer 110 in response to address recognition by the unit 1167. The bus 115 also provides an input to the unit 1167 to enable address recognition at certain times and to disable address recognition at other times.

A direct memory access control unit 1169 is connected with the interrupt control unit 1168, and with the bus 115, and with the series to parallel converter 1164, whereby access may be had to and from the memory unit 112 over the bus 115.

The bus 1166 is connected to a bus switch 11610, by which the parallel data bits on the bus 1166 may be connected onto the parallel lines of the bus 115. The bus switch 11610 is connected by control lines to the address decode-monitor logic unit 1167 and to the direct memory access control unit 1169.

The switch unit 11610 also connects the bus 115 to the input of a parallel to serial converter 11612, the output of which is amplified in an amplifier 11613, and supplied to a transducer such as a light emitting diode 11614 and through a current limiting resistor 11615 to a source of reference potential. The transducer 11614 is optically coupled to the optical transmission line 117. A clock pulse line 11611 is connected directly from the bus 115 to the converter 11612, and another control line interconnects the converter with the address decode-monitor logic unit 1167. The electrical components illustrated in FIG. 12 are well known to those skilled in the art and therefore need not be described in detail herein.

Data to be transmitted over the optical transmission line 117 is supplied by the computer 110 to the bus 115, and the switch unit 11610 is controlled to supply the data in the form of parallel bits to the parallel to serial converter 11612. There they are temporarily stored, while being read out in serial fashion under control of the clock pulses supplied over the line 11611. Preferably, for each packet of information transmitted over the lines 117 and 118, two addresses are supplied. One address identifies the source of the information and the second identifies its destination. The destination address controls operation of the address decode-monitor logic unit 1167. This unit also monitors incoming data to detect a simultaneous selection of one destination by two or more source devices. This operation is possible by using a code for transmission of information, particularly address information, which has an error detecting feature, so that false information arising due to a chronological coincidence of two or more transmission operations can be detected. A $$\binom{m}{n} - \text{code}$$

is preferably employed as an error detecting code. It is provided with a constant predetermined Hamming distance between the binary values to facilitate error detection.

All of the information transmitted over the passive bus system is received by all of the input-output devices 116. Each of the input-output devices 116 examines the received address information as to its format and as to its content. When an input-output device detects a destination address allocated to it, free of error, the information is through-connected to its functional device such as the computer 110. When its destination address is not recognized, the received and intermediately stored information is cancelled, preparatory to receiving further address information.

Preferably, the receiver part R of a transmitter-receiver unit 8 (as in FIG. 3) receives the information transmitted by its own transmitter, so that it may be checked with the information which it is at that time transmitting. For this purpose, a known comparator may be used, for comparing the received information with transmitted information maintained in storage within the transmitter unit. In the case of a reception error, which may be caused by simultaneous communication messages on the passive bus, the transmission operation is interrupted and initiated again, with greater spacing between transmission pauses, until the receiver receives the transmitted information in an error free condition.

When an addressing operation in unequivocally terminated, received information is transferred, by the internal computer bus 115, to the CPU 111. Therefore, the input line 118 is normally completely decoupled from the CPU 111. Specific functions of the CPU 111 have priority over input of external information, and to this end operation of the units 1167–1169 (FIG. 12) may be controlled by signals from the CPU 111 over the bus 115.

It is preferable in the system of the present invention to provide for information transmission directly between memory units 112 of the several minicomputers such as the computer 110, so that the respective CPU's are not required during direct memory access operations. Although phototransistors have been described as the transducers which receive optical information over the optical transmission lines, it will be appreciated by those skilled in the art that photodiodes may be used instead.

In the multi-computer system of FIG. 1, each of the microcomputers 21–25, 41 and 42 incorporate an optical input-output device such as the unit 116 (FIG. 11). All of the input-output devices 116 are optically coupled together over the internal communications function unit 31. In addition, they may be connected to selected ones of the various system components by means of the internal computer bus 115, which may serve to interconnect the units of different ones of the computers 110.

The optical transmission lines may take the form of light wave guides. Such wave guides are generally constructed in the form of single fibers, but multi-fiber wave guides may be employed if desired.

In one arrangement, employing transmission lines having two optical bus lines, a first of the two bus lines is provided for the transmission of addresses and data, and diagnostic information is transmitted on the second bus line for the purpose of error recognition and/or error localization. Information representing a test request can be transmitted over one of the two optical bus lines, with information representing a test execution transmitted over the second bus line. In this way, the correct operation of the two optical bus lines can be monitored to insure error free operation. In some cases it is desirable, particularly for reasons of security, to interchange the functions of the two optical bus lines.

When the arrangement of FIG. 9 is employed, using submixers as well as a central mixer, a plurality of junction points are offered both at the central mixer and at the submixers, so that an optimization of the distribution of the light power can be achieved in the bus system.

Although the present invention has been described above in the context of a passive bus system for multi-computer systems, it may be also employed in other systems, for example, switching systems, monitoring systems for industrial processes, and onboard networks particularly for aircraft and the like. It will be apparent that various modifications and additions may be made in the apparatus of the present invention without departing from the essential features of novelty thereof which are intended to be defined and secured by the appended claims.

What is claimed is:

1. In a decentrally organized multi-computer system incorporating a plurality of function units, a passive bus communication system comprising an internal communication function unit for carrying on all data exchange operations between individual ones of said function units, said passive bus communications system employing exclusively optical transmission means, means associated individually with a plurality of said function units for the control of said bus system, a plurality of optical transmitter-receivers individually allocated to said function units and a light wave guide for optically connecting said optical transmitter-receivers to all other optical transmitter-receivers, said light wave guide being individually allocated to each said transmitter-receiver by means of an optical mixer, said optical mixer comprising a bidirectional mixer operating as the central mixer in a central level of the passive bus system, and including a plurality of transmission-reception lines each of which is respectively connected between the branching point of a branching unit and one of a plurality of terminals of a first group of terminals of the central mixer, a plurality of auxiliary computers, means for connecting said auxiliary computers to terminals of said branching units, and means for connecting at least one function unit directly to a plurality of terminals of a second group of terminals of the central mixer without using a branching unit.

2. The passive bus system according to claim 1, wherein a transmission part and a reception part of all transmitter-receivers are connected via optical transmission lines and optical reception lines to first and second terminals of an optical branching unit, a third terminal of said branching unit being connected via a transmission-reception line to a terminal of the bidirectional mixer.

3. The passive bus system according to claim 1, wherein single-element transmitter-receivers are individually allocated to said function units, each of said single-element transmitter-receivers being connected to a terminal of said bidirectional mixer via a transmission-reception line individually allocated to said single-element transmitter-receiver.

4. The passive bus system according to claim 1, wherein said bidirectional mixer functions as the central mixer in a central level of the passive bus system; and including a plurality of transmission-reception lines connected to a plurality of terminals of a first group of terminals of the central mixer, each of said transmission-reception lines being connected to a branching unit, a plurality of auxiliary computers each having a transmission part and reception part connected to first and second terminals of one of said branching units, a plurality of unidirectional optical submixers connected to a plurality of terminals of a second group of terminals of the central mixer; and means for connecting a plurality of said function units to terminals of said submixers.

5. The passive bus system according to claim 4, wherein said unidirectional submixers are connected via bidirectional transmission-reception lines to the central mixer, and including a plurality of branching units connected to said submixers, and means connecting said function units to said central mixer via unidirectional transmission and reception lines, so that a tree structure results for the bus system.

6. The passive bus system according to claim 5, wherein additional function units are connected with their transmission and reception parts to the central mixer or to at least one submixer, directly via unidirectional transmission and reception lines, so that a hybrid structure results for the bus system.

7. The passive bus system according to claim 4, wherein the connection of the submixers is provided via at least two transmission or reception lines, whereby a corresponding number of terminals are provided both at the central mixer and at the submixers, to achieve an optimization of the distribution of the light power.

8. The passive bus system according to claim 1, including at least one function computer having its transmission part connected to a terminal of a first connection side of the unidirectional mixer via a function computer transmission line, and having its reception part connected to a terminal of a second connection side of the unidirectional mixer via a function computer reception line; and including at least one auxiliary computer having its transmission part connected to a further junction point of the first connection side of the unidirectional mixer via an auxiliary computer transmission line, and having its reception part connected to a further terminal of the second connection side of the unidirectional mixer via an auxiliary computer reception line.

9. The passive bus system according to claim 1, wherein all light wave guides comprise a single light wave guide; and wherein all data transmission operations are executed by means of serial light pulses in chronological succession.

10. The passive bus system according to claim 9, wherein said light wave guides are constructed as single-fiber wave guides.

11. The passive bus system according to claim 9, wherein the light wave guides are constructed as multi-fiber wave guides.

12. The passive bus system according to claim 1, wherein the transmission part consists of a light emitting diode, and a pre-connected amplifier; and wherein the reception part consists of a phototransistor, and a post-connected amplifier.

13. The passive bus system according to claim 1, wherein the transmission part consists of a light-emitting diode LED, and a pre-connected amplifier; and wherein the reception part consists of a photodiode and a post-connected amplifier.

14. The passive bus system according to claim 1, wherein an individually allocated optical input-output device is provided for each of said function units, each said optical input-output device being coupled to all other input-output devices via an output line and via an input line, and being connected to further devices of its associated function unit via an internal computer bus.

15. The passive bus system according to claim 9, wherein a control clock is derived from the chronologically successive light pulses of the optical information, means for intermediately storing information bits gained from the individual light pulses and representing electrical character pulses; and a clock buffer associated with the optical input-output device, said clock buffer being connected to said intermediate storage means to synchronize the storage and recall of said information bits with the working clock of an associated central processing unit CPU.

16. The passive bus system according to claim 1, including two optical bus lines, means for transmitting useful data information via the first of the two optical bus lines and means for transmitting diagnostic information via the second of the two optical bus lines for the purpose of error recognition and error localization.

17. The passive bus system according to claim 1, including two optical bus lines, means for transmitting information representing a test request via the first of the two optical bus lines and means for transmitting information representing a test execution via the second of the two optical bus lines, so that the functionability of the two optical bus lines can be monitored.

18. The passive bus system according to claim 16, including means for changing over the two optical bus lines, whereby the functions can be interchanged.

19. A method for operating a passive bus system for a decentrally organized multi-bus computer system incorporating exclusively optical transmission means for all data exchange operations between plural function units comprising the steps of:
providing address information in each of the information packets to be transmitted, said address information consisting of two addresses, namely, a source address representing the information source and a destination address representing the information destination;
transmitting, from the transmission part of the transmitter-receiver of a designated function unit, information packets containing said address information to all of the function units comprising said computer system;
receiving in the reception part of the transmitter-receiver of said designated function unit the information packets transmitted by the transmission part of the transmitter-receiver of said designated function unit;
checking a received information packet in the reception part as to non-falsification by comparing it with the corresponding information packet still available in the transmission part;
interrupting further transmission of information packets upon the detection of erroneously received address information;
repeating the transmitting operation with successively longer pauses between the information packets until the reception part has received non-erroneous information;
receiving in the reception part of the transmitter-receiver of the remaining function units all transmitted information packets;
checking the received address information by each said remaining function unit by comparing the destination address of the received address information with the address associated with that function unit;
accepting the information contained in the information packet whenever the destination address of the received address information matches the address of the function unit; and
cancelling the received information whenever the destination address of the received address information does not match the address of the function unit.

20. The method according to claim 19, including the step of transmitting said address information in a code with error detectability, so that an information falsification arising due to a chronological coincidence of two or more transmission operations can be detected.

21. The method according to claim 20, including the step of employing a code with a constant, prescribed hamming distance between the binary words as the code with error detectability.

22. The method according to claim 20, including the steps of initiating an interrupt procedure for inputting a received information via an internal computer bus into a central processing unit only when an addressing operation is terminated, to allow a complete decoupling of the input line from the central processing unit, and allowing specific functions of the central processing unit to have priority over an input of said received information.

23. The method according to claim 19, including the step of executing an information transmission or a data transfer directly between memories of two or more computers, so that the associated central processing units are disconnected from the internal computer bus, whereby they can sequence priority processing operations or remain in idle condition.

* * * * *